United States Patent
Hausladen

(10) Patent No.: US 8,439,181 B2
(45) Date of Patent: May 14, 2013

(54) METHOD AND DEVICE FOR HOLDING CONTAINERS

(75) Inventor: Wolfgang Hausladen, Motzing (DE)

(73) Assignee: Krones AG, Neutraubling (DE)

( * ) Notice: Subject to any disclaimer, the term of this patent is extended or adjusted under 35 U.S.C. 154(b) by 643 days.

(21) Appl. No.: 11/795,748

(22) PCT Filed: Jan. 13, 2006

(86) PCT No.: PCT/EP2006/000257
§ 371 (c)(1),
(2), (4) Date: Feb. 4, 2008

(87) PCT Pub. No.: WO2006/077050
PCT Pub. Date: Jul. 27, 2006

(65) Prior Publication Data
US 2009/0014615 A1    Jan. 15, 2009

(30) Foreign Application Priority Data
Jan. 20, 2005 (DE) .......................... 10 2005 002 715

(51) Int. Cl.
*B65G 35/00* (2006.01)
(52) U.S. Cl.
USPC .................. 198/478.1; 198/470.1; 198/803.7; 414/751.1
(58) Field of Classification Search .......................... None
See application file for complete search history.

(56) References Cited

U.S. PATENT DOCUMENTS

| 4,467,909 | A |   | 8/1984  | Jorss et al. |
| 5,029,695 | A | * | 7/1991  | Kovara ........................ 198/473.1 |
| 5,598,859 | A |   | 2/1997  | Kronseder |
| 5,778,633 | A | * | 7/1998  | Sweeny ........................... 53/201 |
| 5,984,617 | A | * | 11/1999 | Seaberg ......................... 414/623 |
| 6,698,160 | B2 | * | 3/2004 | Peronek et al. .................. 53/317 |

FOREIGN PATENT DOCUMENTS

| CH | 348623     | 2/1922  |
| CN | 1132668 A  | 10/1996 |
| DE | 3143511    | 5/1983  |
| DE | 3416654    | 11/1985 |
| DE | 29713510   | 8/1998  |
| DE | 20020456   | 11/2001 |
| DE | 200305988  | 7/2003  |
| DE | 10234374   | 2/2004  |
| DE | 10325137   | 1/2005  |
| EP | 0721808    | 7/1996  |
| EP | 1295820    | 3/2003  |
| EP | 1512863    | 3/2005  |
| JP | 6183551    | 7/1994  |
| JP | 7237745    | 9/1995  |

* cited by examiner

*Primary Examiner* — Kavel Singh
(74) *Attorney, Agent, or Firm* — Marshall, Gerstein & Borun LLP

(57) ABSTRACT

A device having a holder for holding a container such as a bottle of a size and with a second other holder for holding a container such as a bottle of another size. In addition, a method for loading a device with containers such as bottles, whereby the containers of one size are placed in a first holder and the containers of another size are placed in a second other holder to allow easy adjustment to a different size of container without requiring any time-consuming retooling work.

23 Claims, 3 Drawing Sheets

US 8,439,181 B2

METHOD AND DEVICE FOR HOLDING CONTAINERS

CROSS-REFERENCE TO RELATED APPLICATION

The present application claims the benefit of priority of International Patent Application No. PCT/EP2006/000257 filed on Jan. 13, 2006, which application claims priority of German Patent Application No. 10 2005 002 715.6 filed Jan. 20, 2005. The entire text of the priority application is incorporated herein by reference in its entirety.

FIELD OF THE DISCLOSURE

The disclosure relates to a device having a holder for holding a container such as a bottle, whereby the container is a certain size. In addition, the invention relates to a method for loading a device with containers such as bottles, whereby a container of one size is placed in a first holder.

BACKGROUND

Bottle processing machines, bottle conveyors and bottle storage devices where bottles are held with a holder are known. For example, DE 29 71 35 10 discloses a rotary filling machine having holding elements for bottles which are arranged rigidly on a rotor or so that they are adjustable in height.

EP 0 721 808 describes a bottle washer for containers in which the containers can be held with holders which are pivotably mounted on a rotor.

EP 1 295 820 A1 discloses a dynamic bottle storage mechanism having a plurality of endless chains which are loaded with gripper-type holders for gripping containers at the neck.

The disadvantage of these known machines and/or conveyors is that the holders are designed for only one bottle size, so that always only one type of bottle can be processed and/or conveyed. Although it is possible to replace the holders in order to be able to process other bottles, these retooling jobs take a relatively long amount of time so that considerable costs are associated with retooling the machinery.

Grippers designed so they are able to hold bottles of different sizes are also known. However, these grippers are either very complex mechanically or they are able to secure bottles of different sizes only inadequately.

SUMMARY OF THE DISCLOSURE

The object of the present invention is therefore to create a device and a method with which it is possible to process containers of different sizes in the most reliable and least expensive manner.

According to the present disclosure, at least one second holder is provided, the second holder being different from the first holder. This second holder may hold a container of a different size. With the two different holders, it is possible to use containers of different sizes without having to retool the device. The holders may be designed so that they can hold only containers of a certain individual size or so that they can hold containers of one size in a certain size range. It is also possible to provide one holder for those containers and another holder having the option of holding containers of a certain size range.

If two holders with a different but overlapping size range are provided, then the total available size range of containers that can be used is expanded without leaving any gaps in the size range.

To save on space, it is advantageous to arrange the two holders closely side by side. This results space being available for only one container in one of the two holders. If both of the two holders are to be occupied simultaneously, then the two holders may also be arranged farther apart from one another.

Furthermore, it is possible to arrange the two holders directly or obliquely above one another. It is necessary only to ensure that a holder does not interfere with a container when the other holder is occupied, respectively.

The device may be any container handling device. Examples include a bottle washer, a rinser, a filler, a sealer, a labeler, an inspector or the like. The device may also be a conveyor or a storage device for temporary storage of containers.

The device advantageously also has a mechanism by which the holders can be loaded with the containers. The device may be adjusted so that either only one or the other holder may be loaded with a container.

In this method, a device is loaded with containers, whereby containers of a first size are placed in a first holder and containers of another size are placed in another second holder. The two holders are different from one another.

BRIEF DESCRIPTION OF THE DRAWINGS

Preferred embodiments of the device and the method will now be explained on the basis of the drawings, in which.

DETAILED DESCRIPTION

Figure 1:
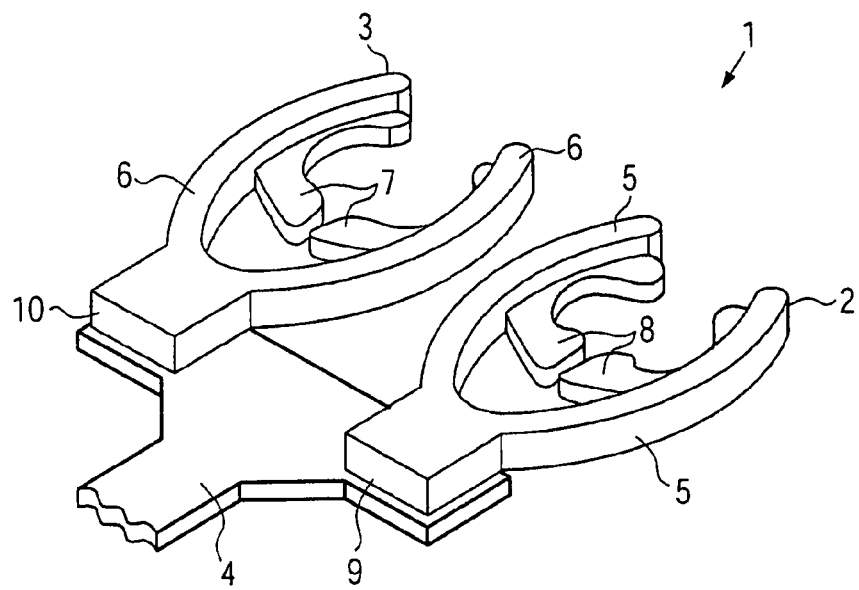
FIG. 1 shows a schematic three-dimensional diagram of a device.

FIG. 1 shows a device 1 having a first holder 2 and the second other holder 3 for containers such as bottles. The two holders 2, 3 are arranged on a holder carrier 4, whereby the holders 2, 3 may be screwed down tightly, for example. The holder carrier 4 has a widened area at the ends of which the holders 2, 3 are arranged. The holders 2, 3 each have connecting parts 9, 10 with which the holders 2, 3 can be attached to a holder carrier 4.

The holder 2 has two outer curved elements 5 within which two molded pieces 8, which define the size or size range of a container to be held, are arranged. In the same way, the holder 3 comprises two outer curved elements 6 in which other molded elements 7 are arranged, defining a different size of a container or a size range for containers. The curved elements 5, 6 may be elastically deflected outward. This may be accomplished, for example, by the fact that a container 11 (see FIG. 2) is moved toward the holder 2 in the direction of the arrow 12.

The outer elements 5, 6 may also be straight or angled.

The molded pieces 7, 8 may each be designed in one piece with the respective outer elements 5, 6, but they may also be joined, screwed on or otherwise attached, as is the case with the other elements 5, 6.

Figure 2:
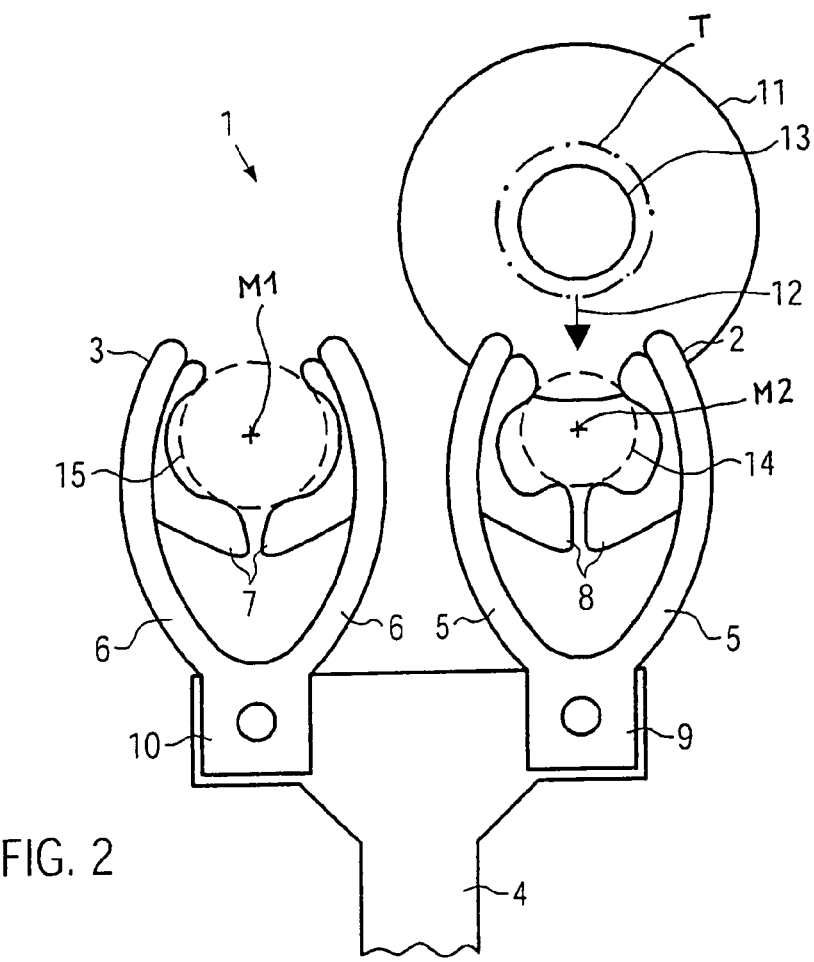
FIG. 2 shows a schematic view of the device from above.

FIG. 2 shows a container 11 in a view from above, where both the outer circumference of the container 11 and the mouth circumference 13 are shown. It should be assumed here, for example, that the holder 2 should hold the container 11 on the neck circumference 13 beneath its carrying ring T. By moving the container 11 in the direction of the arrow 12 toward the holder 2, the molded parts 8 are forced apart against a spring force of the curved elements 5. In the end position (see dotted line 14), the container 11 is held in the holder 2 in a form-fitting manner and is centered with respect to this center axis M2. Similarly, a container may be brought to the position 15 in the other holder 3, as illustrated with the dotted lines. As shown clearly in FIG. 2, the diameter of the dotted circle 15 is greater than that of the circle 14, which means that a container 11 having a larger circumference can be held and centered with respect to the same center axis M1.

The curved elements 5, 6 and the molded parts 7, 8 may be made of metal, such as stainless steel, plastic, rubber, rubberized metal, plastic-coated metal or similar materials.

The elements 5, 6 may be rotatably or displaceably mounted and may be prestressed, forcing them into the closed position with a restoring force, e.g., by means of a spring element or a rubber element. Instead of or in addition to this, however, the elements 5, 6 may also be elastic themselves. It is also possible to actively move the elements 5, 6 into an opened position or a closed position by means of special control devices.

The curved elements 5, 6 of the two holders 2, 3 are shown as the same size in FIG. 2. However, they may also be of different sizes so that holders of different sizes are the result.

Figure 3:
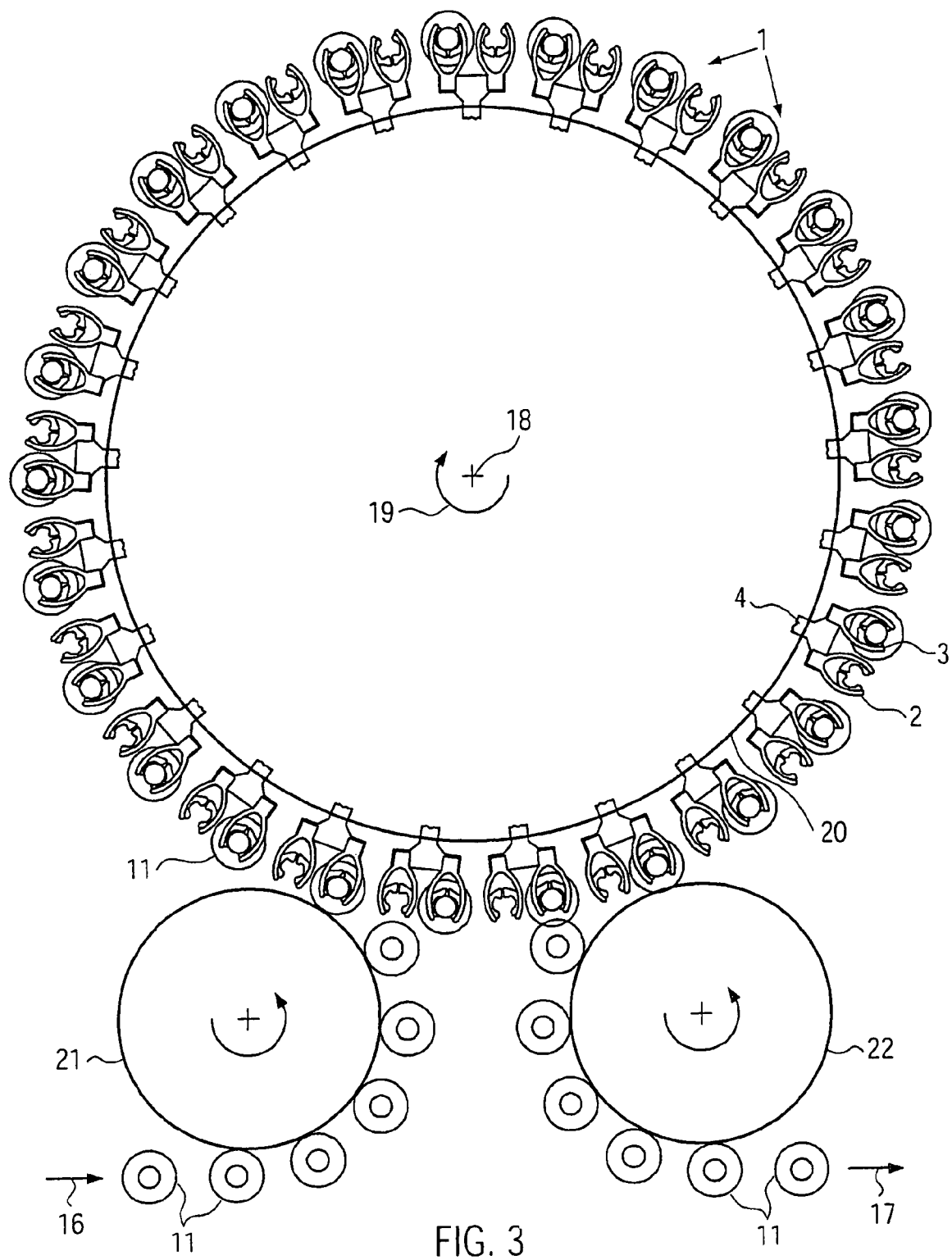
FIG. 3 shows a schematic view of the device with a carousel from above.

FIG. 3 shows a container handling machine with a carousel 20. The carousel 20 may revolve about an axis 18 in the direction of the arrow 19. On the circumference of the carousel 20, several similar devices 1 like those shown in FIGS. 1 and 2 are arranged. A feed star 21 and a discharge star 22 which are arranged next to the carousel 20 can convey the containers 11 toward the carousel 20 or away from it.

The feed star 21 is designed so that it transfers the containers 11 either to the holder 2 or to the holder 3. To do so, the feed star 21 may be rotated, adjusted, offset or otherwise adapted accordingly.

It is also possible to simply retool the feed star electronically by having it assume a different relative position in comparison with the positioning of the carousel 20, so that the containers 11 are transferred to the other holder. The same thing is also true of the discharge star 22.

The carousel 20 may be the carousel of a bottle washer, a rinser, a filler, a labeler, a sealer, an inspector or the like. However, it is not obligatory for any of these devices to include a carousel.

Figure 4:
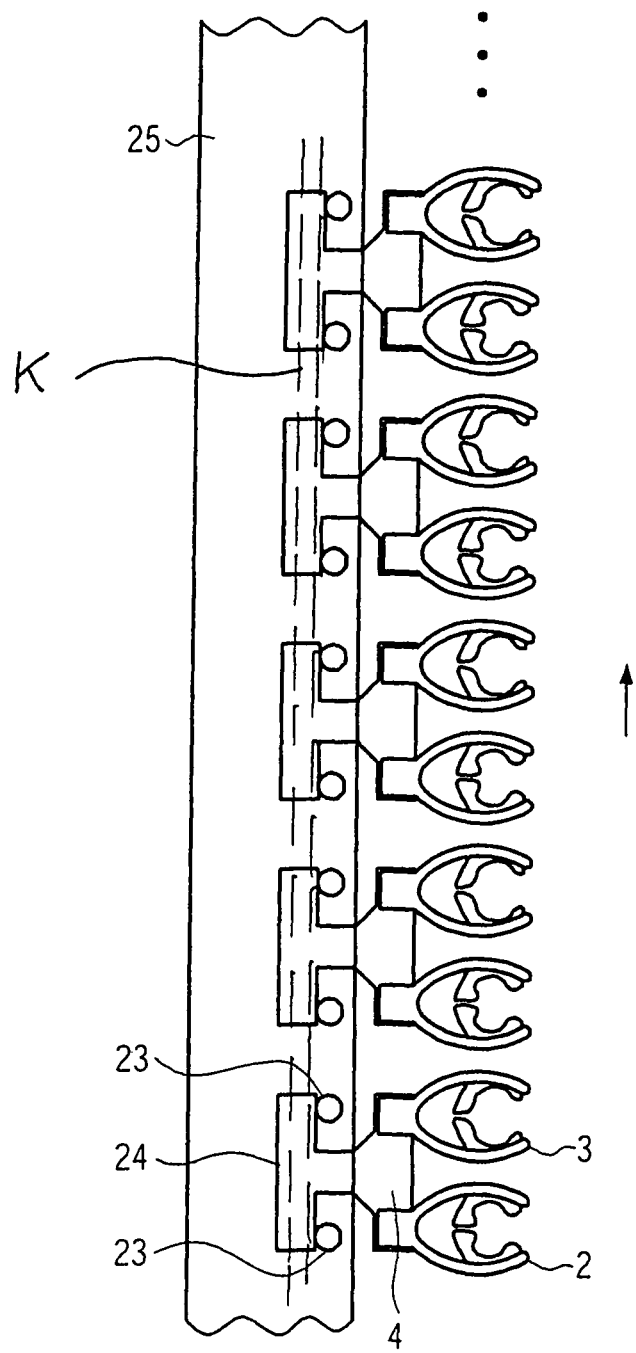
FIG. 4 shows a schematic view of a device with a linear guide from above.

FIG. 4 shows an embodiment in which several similar devices 1 are arranged on one conveyor element 24. This conveyor element 24 may be moved along a guide 25, such as that which may be used with conveyors or storage devices, for example. The transport device 24 may have rollers 23, for example. A drive for the transport elements 24 is not shown in FIG. 4 for the sake of simplicity.

A device 1 having a first holder and at least one second other holder may also be provided on a revolving chain, a revolving conveyor belt or the like. A chain K is shown with dotted lines in FIG. 4.

For loading the devices 1 and for removing the containers 11 in the case of a conveyor or a storage device, a feed star and/or a discharge star or some other suitable device may likewise be provided.

The inventive method will now be explained on the basis of FIG. 3 as an example. The containers 11, e.g., bottles, enter in the direction of the arrow 16 and are transferred through the feed star 21 to the carousel 20 with the devices 1, more specifically each on a holder 3. After revolving along the circumference of the carousel 20, the containers 11 are transferred by the discharge star 22 and are removed in the direction of the arrow 17. If another type of container 11 is to be processed, then the feed star 21 is adjusted in relation to the carousel 20. Therefore, the feed star can transfer the containers 11 to the holder 3 instead of to the holder 2. It is also possible to provide two feed stars 21, one being provided for loading the first holder and the other being provided for loading the second holder. The same thing also applies to the two discharge stars 22.

A procedure with the device from FIG. 4 is similar.

Furthermore, it is possible to adjust the carousel 20 or the transport elements 24 and/or the chain K with respect to the feed star 21 and the discharge star 22, namely according to the distance from M1 and M1. Therefore, the position of the containers remains unchanged in space and therefore also their position with respect to the processing elements remains unchanged, e.g., filling valves which revolve in synchronization with the carousel by means of their own rotor or carrier, which is not adjustable with respect to the feed star and the discharge star. Accordingly the central axes M1 and M2 are arranged on the same circular path.

The invention claimed is:

1. A device for holding a container such as a bottle, comprising a first gripper for holding a container of one size, and, at least one second separate gripper for holding another type of container of another size, wherein the first gripper is of a different size than the second gripper, wherein the first and the second grippers are arranged on a gripper carrier side by side, and wherein both grippers are attached to the gripper carrier at the same time.

2. The device according to claim 1, wherein the size of the container and the size of the other container are each sizes that are predetermined by the grippers in the holding range.

3. The device according to claim 1, wherein the size of the container and the size of the other containers are each in a size range that is predetermined by the grippers, whereby the size ranges in the holding range are different, but they overlap at least partially.

4. The device according to claim 1, wherein the grippers are made one of a metal or an elastic material.

5. The device according to claim 1, wherein the grippers are arranged one of side by side or one above the other, so that when one gripper is occupied with a container, no further container can be arranged in the second gripper.

6. The device according to claim 5, wherein both grippers can be occupied simultaneously by one container.

7. The device according to claim 1, wherein the second holder is of a different size than the first gripper.

8. The device according to claim 1, wherein the device is a container handling device.

9. The device according to claim 1, wherein the device is one of a conveyor or a storage device.

10. The device according to claim 1, wherein a plurality of first and second grippers is provided.

11. The device according to claim 1, and a mechanism for loading a gripper with a container, whereby the mechanism or the device can be adjusted so that either the one or the other gripper can be loaded with a container.

12. The device according to claim 1, wherein the grippers grip the containers in a form-fitting manner.

13. A method for loading a device with containers such as bottles, wherein the containers of one size are placed in a first gripper and the containers of another type and another size are placed in a second separate gripper, wherein the first gripper is of a different size than the second gripper and wherein both grippers are attached side by side to a gripper carrier at the same time.

14. The device according to claim 1, wherein both grippers are fixedly connected to the holder carrier.

15. The device according to claim 4, wherein the metal is stainless steel.

16. The device according to claim 4, wherein the elastic material is one of plastic, rubber, or coated metal.

17. The device according to claim 8, wherein the container handling device is one of a rinser, filler, labeler, bottle washer, sealer or inspector.

18. The device according to claim 10, wherein the number of first and second grippers is the same, and they alternate.

19. The device according to claim 12, wherein the grippers also grip the container by a frictional force.

20. The device according to claim 12, wherein the grippers center the containers.

21. The device according to claim 1, wherein each gripper further comprises two outer curved elements within which two molded pieces are arranged, wherein the two molded pieces are adapted to receive a portion of the container and retain the container between the two molded pieces.

22. The device according to claim 21, wherein the two molded pieces of each gripper are forced apart against a spring force provided by the outer curved elements to receive the container.

23. The device according to claim 21, wherein the spring force is provided by at least one of the resiliency of the outer curved elements, a spring element acting on the outer curved elements, and an elastic element acting on the outer curved elements.

\* \* \* \* \*